FLUID REGULATING APPARATUS

INVENTOR.
WILLIAM W. BASSETT

BY Arthur H. Swanson

ATTORNEY.

FLUID REGULATING APPARATUS

Filed June 24, 1964 10 Sheets-Sheet 2

INVENTOR.
WILLIAM W. BASSETT

BY Arthur H. Swanson

ATTORNEY.

Nov. 19, 1968 W. W. BASSETT 3,411,529

FLUID REGULATING APPARATUS

Filed June 24, 1964 10 Sheets-Sheet 3

INVENTOR.
WILLIAM W. BASSETT
BY Arthur H. Swanson
ATTORNEY.

INVENTOR.
WILLIAM W. BASSETT
BY Arthur H. Swanson
ATTORNEY.

FLUID REGULATING APPARATUS

Filed June 24, 1964 10 Sheets-Sheet 5

INVENTOR.
WILLIAM W. BASSETT
BY Arthur H. Swanson
ATTORNEY.

Nov. 19, 1968 W. W. BASSETT 3,411,529

FLUID REGULATING APPARATUS

Filed June 24, 1964 10 Sheets-Sheet 6

INVENTOR
WILLIAM W. BASSETT
BY Arthur H. Swanson
ATTORNEY.

FLUID REGULATING APPARATUS

Filed June 24, 1964

INVENTOR.
WILLIAM W. BASSETT

BY Arthur H. Swanson

ATTORNEY.

INVENTOR.
WILLIAM W. BASSETT
BY Arthur H. Swanson
ATTORNEY.

INVENTOR
WILLIAM W. BASSETT
BY Arthur H. Swanson
ATTORNEY.

FLUID REGULATING APPARATUS

Filed June 24, 1964 10 Sheets-Sheet 10

INVENTOR.
WILLIAM W. BASSETT
BY Arthur H. Swanson
ATTORNEY.

United States Patent Office 3,411,529
Patented Nov. 19, 1968

3,411,529
FLUID REGULATING APPARATUS

William W. Bassett, Wyncote, Pa., assignor to Honeywell Inc., Minneapolis, Minn., a corporation of Delaware
Filed June 24, 1964, Ser. No. 377,562
14 Claims. (Cl. 137—403)

It is an object of the invention to disclose a fluid pressure regulating apparatus for maintaining the level of a liquid in a tank at different preselected levels.

Regulating apparatus which has heretofore been used to maintain the fluid in a tank at preselected levels has employed a separate transmitter to send a first fluid pressure signal that is proportional to the level of the fluid in a tank to a controller. The controller, in turn, is used to send a second fluid pressure signal that is proportional to, but of a different pressure level than, the first signal to, e.g., the head of a control valve. The degree to which the control valve is opened or closed by this second fluid pressure signal is used to regulate the fluid flow into the tank.

One of the deficiencies that has been encountered in the use of a liquid level control system of the type just described is that inaccuracies, due to friction between the many movable parts, are introduced into the overall control system as the controller converts the first signal into the second fluid pressure control signal.

It is, therefore, a more specific object of the present invention to disclose a unique fluid pressure regulating apparatus which eliminates the need for the aforementioned controller and, hence, provides a more accurate overall control system to maintain the level of a fluid in a tank at preselected levels than that afforded by presently-available liquid level control systems which depend on a controller to perform this function.

It is another object of the invention to disclose a unique fluid pressure liquid level regulating apparatus of the aforementioned type which contains many, common, interchangeable parts that can be readily assembled in two different ways to form either a direct-acting or reverse-acting transmitter.

It is another object of the invention to disclose a transmitter whose parts can be readily assembled in one manner to make it useful as a direct-acting unit or be readily assembled in another manner to make it useful as a reverse-acting unit.

It is a further object of the invention to disclose interchangeable parts for a transmitter that can effect economies in converting it from one that will produce a proportional increase in fluid pressure on the head of a control valve for each incremental increase in the level of the liquid in the tank and vice versa to one that will produce a proportional decrease in fluid pressure on the control valve for each incremental increase in the level of the liquid in the tank and vice versa.

Another object of the present invention is to employ in the aforementioned fluid pressure liquid level regulating apparatus a single angularly rotatable part that has a plurality of different calibrated proportional band indicating scales thereon, the indicating marks of which can selectively be aligned with a stationary mark to provide different setpoint adjustments that will enable the percentage of liquid level in the tank to be preset to any desired value.

It is another object of the present invention to disclose a unique, direct-reverse acting transmitter that can be used interchangeably in any one of a series of different types of control valve positioning units that are employed to regulate the flow of fluid from a non-pressurized tank so that the level of the liquid in the tank can be controlled over a selected series of wide or narrow ranges.

*Direct acting control (FIGS. 7, 13, and 16)*

For the purpose of describing the control action taking place under this direct acting control condition the position of the control valve in a drain conduit of a liquid filled tank is assumed to be in a partially open position that is somewhere between its fully open and fully closed position. More specifically it is assumed that this position of a control valve permits the rate of flow of the liquid passing out of the drain conduit of the tank to equal a steady rate of liquid flowing into the tank so that a fixed level of liquid in the tank is being maintained.

Under the aforementioned condition a flapper associated with a nozzle in the transmitter is in a partially open position which will allow a portion of the filtered air supply under pressure that is delivered to the nozzle through a restriction to be bled to atmosphere.

When the flow rate of the liquid passing into the tank is increased it is necessary in many industrial processes to still maintain the liquid in the tank at the previously mentioned fixed level to e.g. prevent overflow and at the same time maintain a high level of liquid in the tank.

While this increase in flow rate of liquid passing into the tank takes place and the liquid in the tank attempts to rise, this action will tend to cause a liquid level sensing diaphragm that forms a wall portion of the tank to move the stem and flapper associated therewith to the right. A spring which is constantly applying a spring biasing force to the flapper will then be able to apply its force to move its flapper from its partially opened nozzle position toward the closed nozzle position.

While the nozzle is being closed in this manner a decrease in a portion of a filtered air supply pressure that is being applied by way of a restriction to the nozzle chamber will be bled to atmosphere. The pressure of the air in the nozzle or in other words the control pressure will thus be increased. This increase in control pressure in the nozzle chamber is also simultaneously applied by way of a passageway within the transmitter and a conduit external thereto to a liquid level set point chamber of a control valve positioning unit shown in FIG. 13 that is associated with the drain conduit connected to the tank. This action will cause a supply air pressure regulating ball valve (FIG. 16) associated with the control valve positioning unit to be moved toward an open position and cause an increase in the pressure of the air that is applied to the top of a diaphragm chamber of the valve actuator (FIG. 13). This action will cause movement of a diaphragm, a diaphragm plate, and the stem and plug of a reverse acting valve associated therewith in a downward direction to a more fully open position in the tank drain conduit than it was in during its previously mentioned partially open starting position. The drain conduit control valve will then be opened an amount that will allow the rate of flow of liquid that is then allowed to pass through the tank drain conduit to equal the increase in the rate of flow of liquid that is flowing into the tank.

Rebalancing of the transmitter also simultaneously takes place by allowing the aforementioned increase in control pressure that took place within the nozzle to be applied to a rebalancing diaphragm that is connected for movement with the flapper actuated stem of the transmitter. When the increase in the control pressure occurs it is applied to push the rebalancing diaphragm and the stem associated therewith to the left to a forced balanced position.

*Reverse acting control (FIGURES 8, 15, and 16)*

For the purpose of describing the control action taking place under this reverse acting control condition the position of the control valve in a drain conduit of a liquid filled tank is assumed to be in partially open position that is somewhere between its fully opened and fully closed position. More specifically it is assumed that this position of the control valve permits the rate of flow of liquid passing out of the drain conduit of the tank to equal the steady rate of liquid flowing into the tank so that a fixed level of liquid in the tank is being maintained.

Under this condition a flapper associated with a nozzle and the transmitter are in a partically open position which will allow a portion of the filtered air supply under pressure that is delivered to the nozzle through a restriction to be bled to atmosphere.

When the flow rate of the liquid passing into the tank is increased it is necessary in many industrial processes to still maintain the liquid in the tank at the previously mentoned fixed level to e.g. prevent overflow and at the same time maintain a high level of liquid in the tank.

While this increase in flow rate of the liquid passing into the tank takes place, and the liquid in the tank attempts to rise this action will tend to cause a diaphragm that forms a wall portion of the tank to move a stem and flapper associated therewith to the right. The force of a spring which is constantly applying a spring biasing force to the flapper will then be partially overcome by the motion of the flapper. The flapper will thus be moved from its partially opened nozzle position towards the fully open nozzle position.

While the nozzle is being opened in this manner an increase in a portion of a filtered air supply pressure that is being supplied by way of a restriction to the nozzle chamber will be bled to atmosphere. The pressure of the air in the nozzle, or in other words the control pressure will thus be decreased. This decrease in control pressure in the nozzle is also simultaneously applied by way of a passageway within the transmitter and a conduit external thereto to a liquid level set point chamber of a control valve positioning unit shown in FIG. 15 that is associated with a drain conduit connected to the tank. This action will cause a supply air pressure regulating ball valve (FIG. 16) associated with the control valve to be moved toward a closed position and a decrease air pressure to be applied to the bottom of a diaphragm chamber of a valve actuator (FIG. 15). This action allows a spring in the actuator acting on the diaphragm plate to move a diaphragm, the diaphragm plate, and the stem and plug of a reverse acting control valve associated therewith in a downward direction to a more fully opened position in the tank drain conduit than it was in during its previously mentioned partially opened starting position.

The drain conduit control valve will then be opened an amount that will allow the rate of flow of liquid that is then allowed to pass through the tank drain conduit to equal the increase in rate of flow of liquid into the tank.

A balancing of the transmitter also simultaneously takes place by allowing the aforementioned decrease in control pressure that took place within the nozzle to reduce the pressure being applied to a rebalancing diaphragm that is connected for motion with the flapper actuated stem of the transmitter.

When this decrease in the control pressure occurs it allows a rebalancing spring of the transmitter to push the stem and level sensing diaphragm associated therewith to the left to a force balanced position.

*Direct and reverse acting liquid level control*

When the steady flow rate of the liquid passing into the tank is decreased the head pressure of the liquid under measurement acting on the sensor diaphragm forming a portion of the tank wall will also be simultaneously decreased. When this occurs the flapper associated with the transmitter nozzle will be moved in an opposite direction to that just described for either the direct acting control or reverse acting control.

During each of these control operations, the reverse acting control valve in the drain line of the tank will be closed an amount that will allow the rate of flow of liquid that is allowed to then pass through the drain line to equal a decrease in rate of flow of liquid into the tank.

A better understanding of the present invention may be had from the following detailed description, when read in connection with the accompanying drawings in which.

Figure 1:
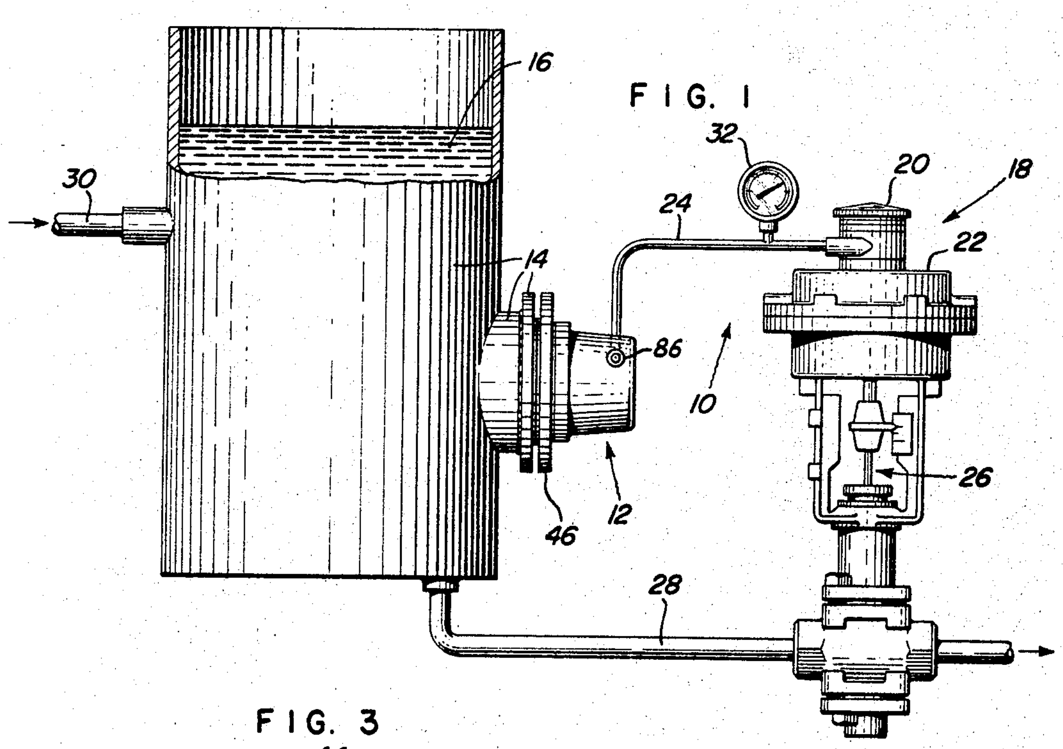
FIG. 1 shows one arrangement in which the unique, direct-reverse acting transmitter is directly connected to a first tank control valve positioning unit.

FIG. 1 of the drawing discloses a fluid pressure, liquid level regulating apparatus 10 that is comprised of a transmitter 12 mounted on the side of a tank 14 containing a liquid 16, and a control valve positioning unit 18 which is comprised of a liquid level adjusting unit 20 and a valve actuator 22 operably connected thereto.

As will be hereinafter described in detail, the unit 20 is operably connected to receive a fluid pressure signal from the transmitter 12 by means of a transmitting conduit 24.

The actuator 22, in turn, is shown connected to a control valve 26 that is positioned in a drain conduit 28 which conduit is connected at one end to the bottom of the tank so that the liquid level of the fluid 16 therein can be maintained at a preselected level.

The tank 14, as shown in FIG. 1, is also provided with an inlet conduit 30 for introducing fluid under pressure into the tank. FIG. 1 also shows a gage 32 to directly indicate the level of the liquid 16 in the tank 14.

Figure 2:
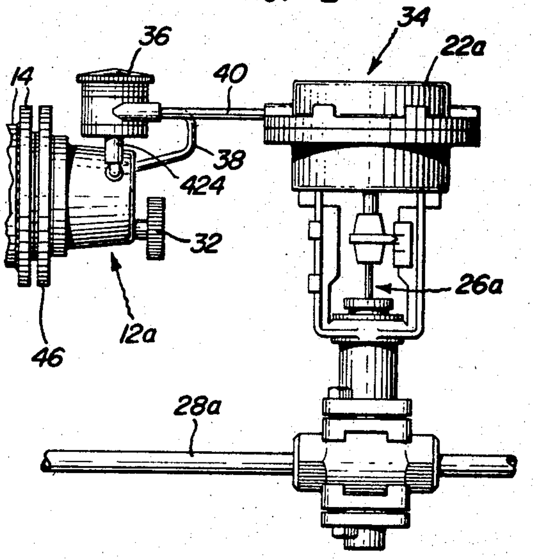
FIG. 2 shows another arrangement in which the transmitter is employed to directly connect it to a second type of control valve positioning unit that is located adjacent a liquid-filled tank whose liquid level is being controlled.

FIG. 2 shows a first modified form of a fluid pressure liquid level regulating apparatus 34 that can be used in lieu of the liquid level regulating apparatus shown in FIG. 1. The apparatus shown in FIG. 2 is comprised of a transmitter **12*a*, valve actuator 22*a*, control valve 26*a*, drain conduit 28*a* and gage 32** which, as will hereinafter be described, are similar to the corresponding parts previously set forth under the description of FIG. 1.

In addition to these parts, FIG. 2 also contains a liquid lavel adjusting unit 36 that is shown operably connected by means of a pressure signal transmission conduit 38 with transmitter **12*a*. FIG. 2 also shows the liquid level adjusting unit 36 connected by means of a pressure signal transmitting conduit 40 with the valve actuator 22*a***.

Figure 3:
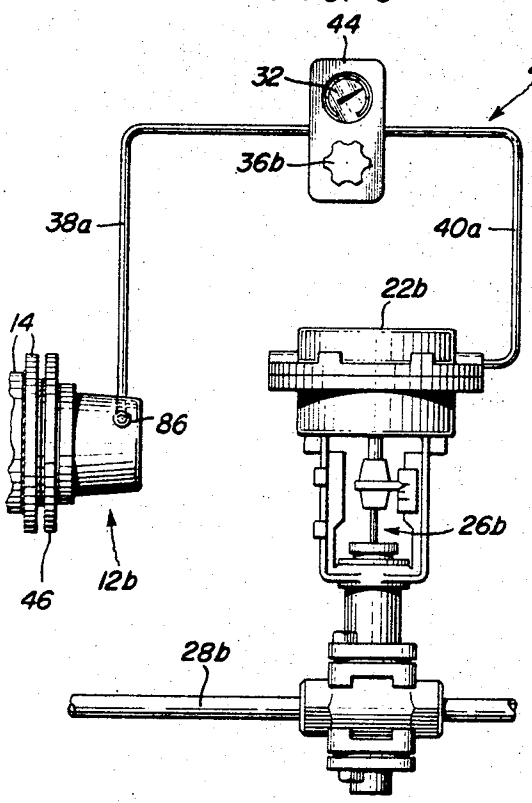
FIG. 3 shows an arrangement similar to that shown in FIG. 2, except that in FIG. 3 the transmitter employed is directly connected to a valve positioning unit that is remotely located with respect to the liquid-filled tank.

FIG. 3 shows a second modified form of the fluid pressure, liquid level regulating apparatus 42 that can be used in lieu of the liquid level regulating apparatus shown in FIGS. 1 and 2. The apparatus shown in FIG. 3 is comprised of a transmitter **12*b*, valve actuator 22*b*, control valve 26*b*, drain conduit 28*b*, liquid level gage 32 and liquid level adjusting unit 36*b*** which are similar to the corresponding related parts previously set forth under the description of FIGS. 1 and 2.

The second modified form of the fluid pressure liquid level regulating apparatus shown in FIG. 3 differs from the arrangement shown in FIG. 2 in that the liquid level gage **32*b* and liquid level adjusting unit 36*b* are mounted on a single block 44 at a remote location from the transmitter 12*b* rather than being mounted at a location that is immediate the transmitter 12*b*** as is the case with the arrangement shown in FIG. 2.

Figures 4, 5, 6:
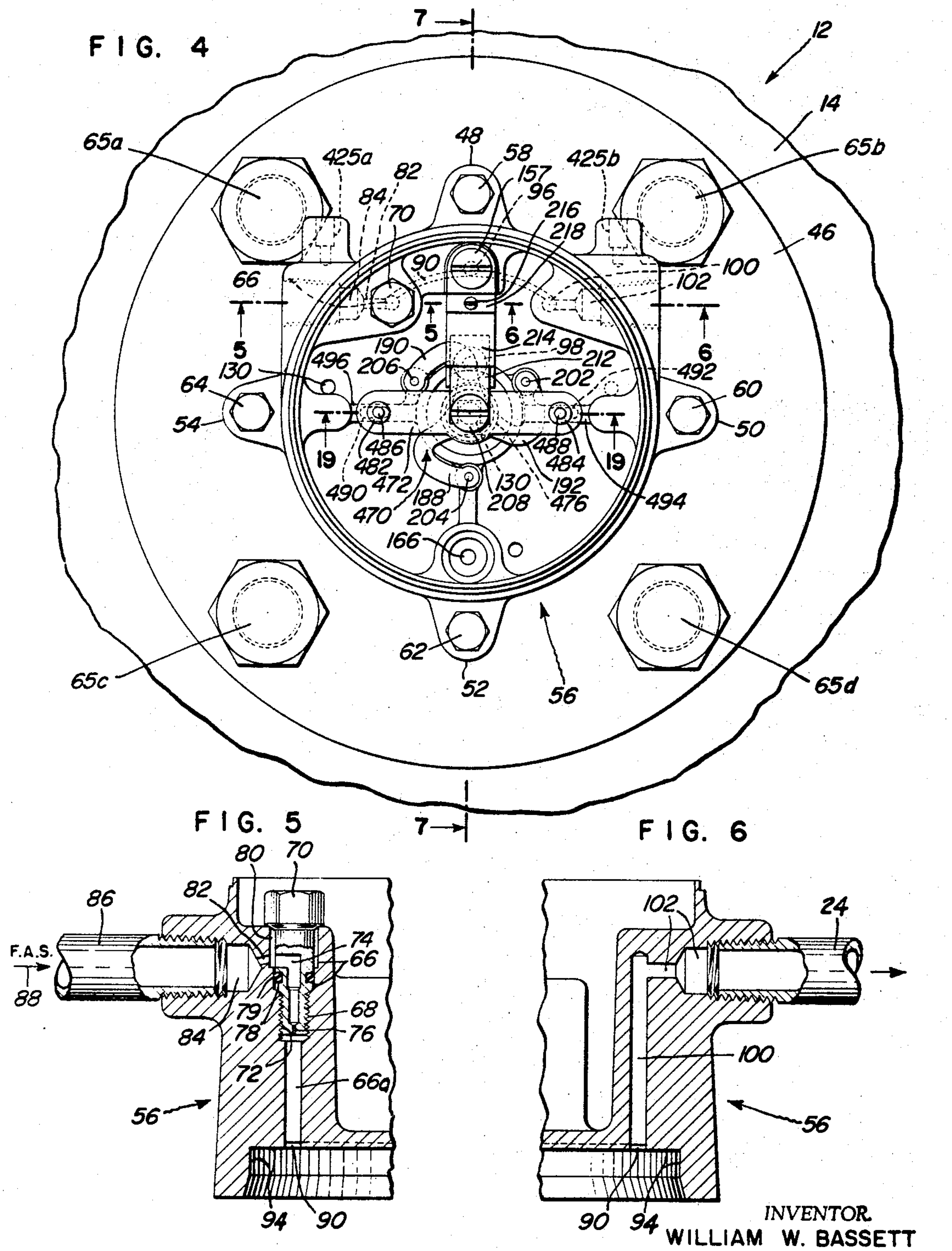
FIG. 4 shows a top plan view of the transmitter that is schematically shown in FIGS. 1–3.
FIG. 5 is a partial sectional view taken along the line 5—5 of FIG. 4.
FIG. 6 is a partial sectional view taken along the line 6—6 of FIG. 4.

FIG. 4 shows a detailed view of the right end of the transmitter 12 that is shown, e.g., in FIG. 1. This view shows a stationary flange 46 on which the integral flanged portions 48, 50, 52, 54 of the casing 56 are mounted by means of the tap bolts 58, 60, 62 and 64. Flange 46 is connected in a fluid-tight manner as shown by means of studs **65*a*, 65*b*, 65*c*, 65*d* and to the tank flange 14**.

A peripheral portion of the casing 56 of the transmitter 12 is shown in FIG. 5 as having a multiple bored-out, inner-stepped surface 66 and as having an internally-threaded end portion 68 at its inner end. A fluid restricting screw member 70 is shown retained within the confines of the upper bored-out surface 66 by screw threads 72 which are engaged with the threaded end portion 68.

A T-shaped passageway 74 is formed as shown in the screw member 70. The lowermost portion of the passageway 74 is shown in FIG. 5 as being of a small diameter and forming a fluid restriction 76.

FIGS. 4 and 5 show a restricting screw member 70 that is provided with a grooved-out portion 78 for accommodating the insertion of an O-ring 79 therein to thereby provide a fluid-tight joint between the member 70 and an elongated central portion of the stepped wall surface forming the passageway 66. A T-shaped passageway 74 within member 70 opens into the cylindrical chamber 80 which, in turn, is connected by way of a fluid passageway 82 to passageway 84. A filtered air supply pressure source (F.A.S.) is indicated as being applied in the direction of the arrow 88 to conduit 86 that, in turn, forms a left end portion of the passageway 84.

FIGS. 4 and 5 also show a groove 90 of an arc-shaped configuration formed in an inner base surface of the casing 56. The space defined by the groove 90 and the top surface of the gasket 92 located in the lower bored-out surface 94 of the casing 56, as shown in FIGS. 5 and 7, provides a passageway through which the air supply can be applied from passageway 66 in a vertical direction through passageway 96 to the nozzle chamber 98.

Figure 9:
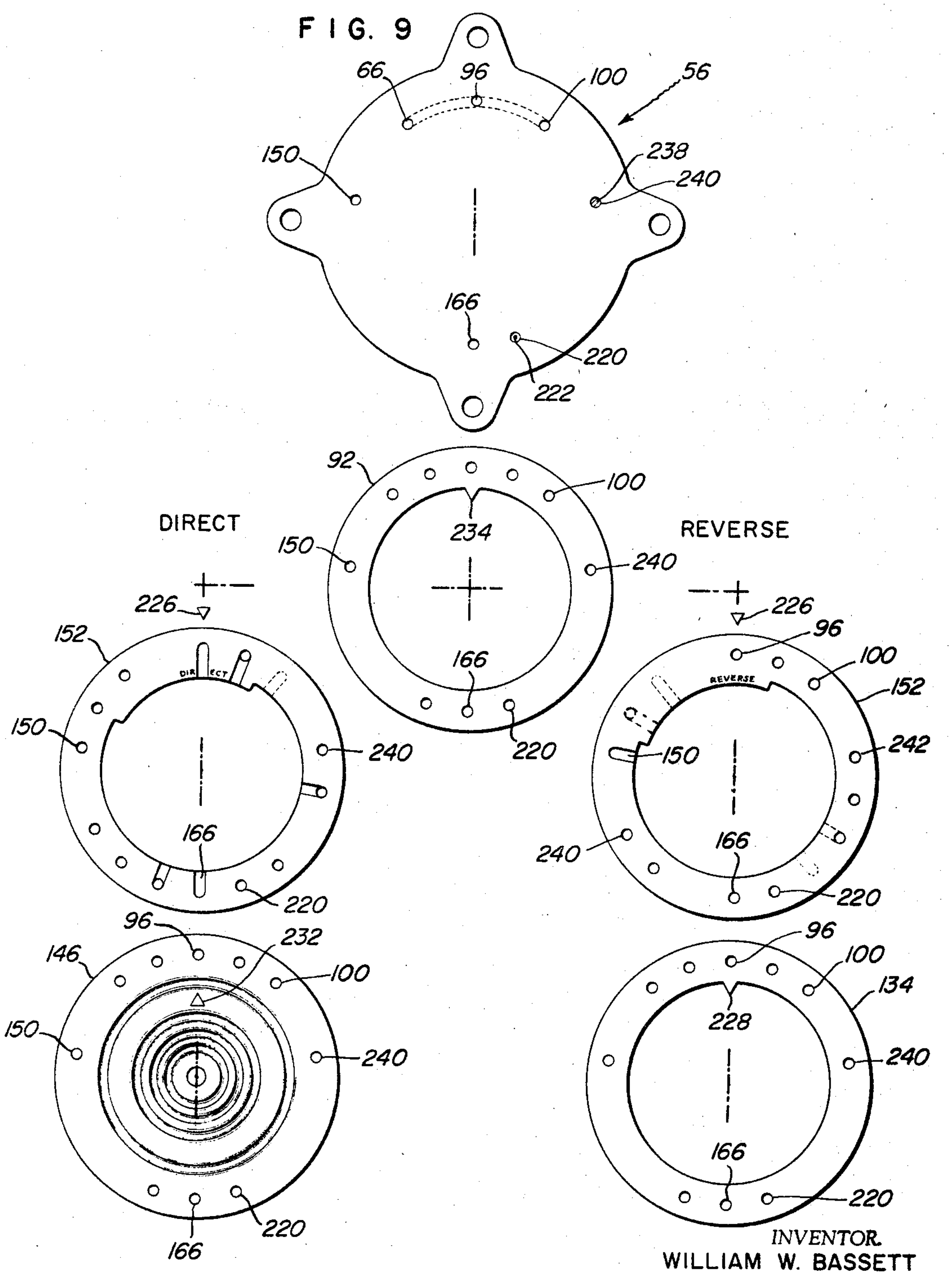
FIGS. 9, 9A show a plan view of the passageways in the lower part of the casing and the other parts of the transmitter and how these parts are positioned for direct and reverse operation.
Figure 9A:
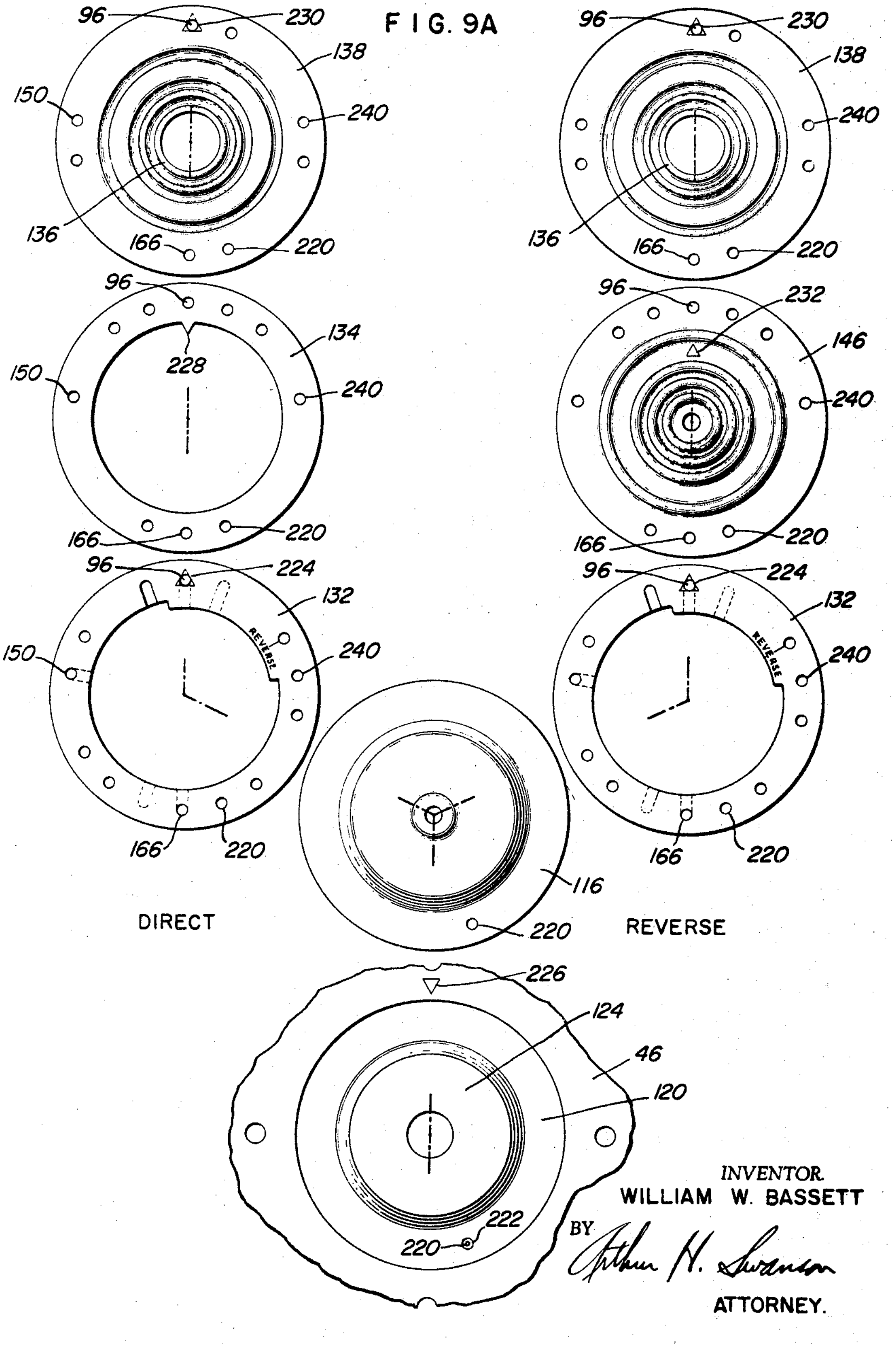

The right end of the groove 90 shown in FIGS. 4 and 9, 9A is connected by way of the vertical passageway 100 with the horizontal passageway 102 to which changes in the control pressure output of the transmitter are passed in the manner hereafter described.

Figure 7:
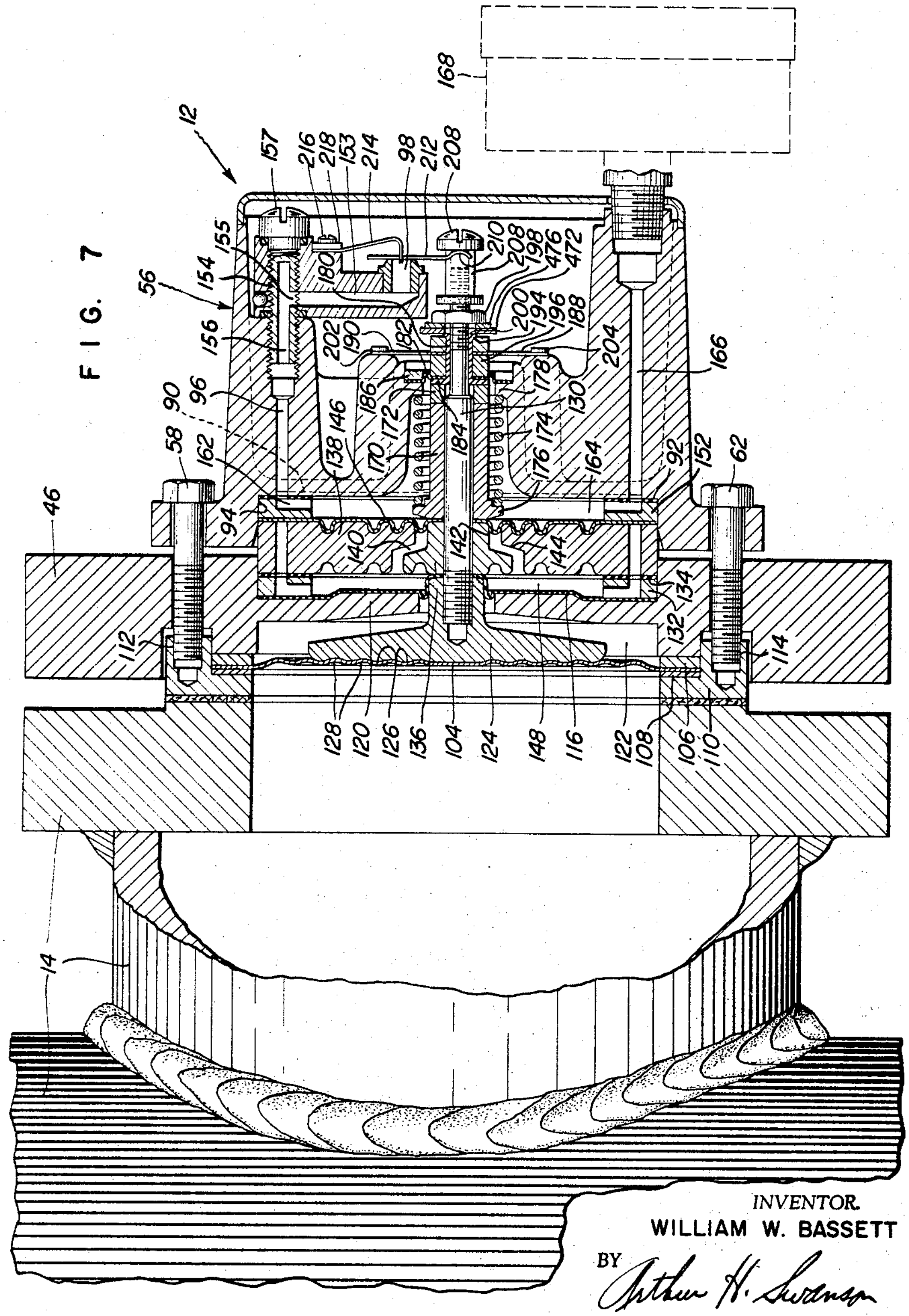
FIG. 7 is a cross-sectional view taken along the line 7—7 of FIG. 4 showing the parts employed in the transmitter when the transmitter is used as a direct-acting unit.

When it is desired to use the transmitter 12 for direct action, the parts of this transmitter are assembled in the manner shown in FIG. 7. The transmitter shown in FIG. 7 is comprised of a diaphragm 104 against which the pressure of the fluid 16 in the tank 14 that is shown in FIG. 1 is applied.

This diaphragm 104 is preferably constructed of a flexible metal such as a thin sheet of a corrosive-resistant material, for example stainless steel. The upper outer peripheral side surface of this diaphragm 104 is bonded in fluid-tight engagement to a diaphragm ring 106. The other outer peripheral side surface of the diaphragm 104 has a gasket 108 which is brought into fluid-tight engagement therewith as shown by rotating the bolts 58–64 so that the ring 110 of the J-shaped configuration into which the threaded ends, for example 112, 114, of the bolts are threaded will be drawn against the left side of the gasket 108.

The diaphragm 104 and the diaphragm 116, that are mounted between the diaphragm rings 110 and a cylindrical central portion 120 of the flange 46, form an atmospheric exhaust chamber 122.

A diaphragm plate 124 having cylindrical grooves 126 in its left side is shown engaging cylindrical ridges 128 in the diaphragm 104 and is shown positioned for movement with the diaphragm 104.

The right end of the diaphragm plate 124 is fixedly connected to transmit motion in a right or left direction from that shown in FIG. 7 by way of a flapper-actuating rod 130 that is shown connected at its left end to the plate 124. Surrounding and spaced from the rod 130 there is shown in FIG. 7 a diaphragm ring 132 and a gasket 134. Also surrounding the rod 130 there is an inner diaphragm plate 136 and an outer diaphragm plate 138. A circular passageway 140 is formed between the outer cylindrical wall 142 of the inner diaphragm plate 136 and the inner cylindrical wall 144 of the outer diaphragm plate 138.

The left surface of the convoluted rolling diaphragm 146 seals off the passageway 140 at its right end, and the left end of this passageway is shown opening into the unused chamber 148 that is, in turn, vented to atmosphere by way of the passageway 150 shown in FIGS. 9, 9A.

The outer circumferential portion of the diaphragm 146 is retained in fluid-tight engagement with the outer circumferential surface of the diaphragm ring 152 by tightening the bolts 58–64 into the position shown in FIG. 7.

As previously noted under the description of FIGS. 4 and 5, the filtered air supply (F.A.S.) 88 is transmitted through conduits 88, 80, 74, restriction 76, passageways 66, 90, up through the passageway 96 to the nozzle chamber 98.

It can be seen from FIG. 7 that the control pressure in nozzle chamber 98 is applied by way of passageways 153, 154, passageways 155, 156 in the fluid-tight tap bolt means 157, passageway 96, 162 to chamber 164 and thence by way of passageway 166 to a standard air pressure measuring gage 168 to indicate the magnitude of this control pressure.

FIG. 7 also shows a spring-retaining sleeve 170 having its left end in contact with the convoluted rolling diaphragm 146 and its right end in contact with ring 172. The coil spring 174 surrounds the sleeve 170. This spring 174 is shown in contact at its left end with a circumferential lip 176 on the left end of the sleeve 170 and shown in contact with a stationary circumferential lip portion 178 of the casing 56 at its other end. Another sleeve 180 is shown slidably mounted on the flapper-actuating rod 130. A diaphragm 182 is shown mounted against flange 184 of sleeve 180. A retaining ring 186 is used to hold the outer peripheral portion of the diaphragm 182 in the inner right end portion of the casing 56.

A plurality of arms 188, 190, 192 is shown in FIGS. 4 and 7 retained on the flapper-actuating shaft 130 by the retaining rings 194, 196 and a nut 198. The nut 198 is threadedly mounted on the shaft so that it can be adjusted toward the right flanged end 200 to pull the flapper actuating rod in a left-to-right direction to seal all joints about this rod. The outer ends of the arms 188–192 are shown fixedly connected by a suitable connecting means 202, 204, 206.

The right end of the flapper actuating shaft 130, shown in FIG. 7, has an internally-adjustable sleeve screw 208. Opposite underside surfaces of the head of this screw 208 contact a rounded forked end portion 210 of a flapper 212.

A plate spring 214 is employed to continuously apply a spring force against the bias of the force being applied to the rounded portion of the flapper 212 by the spring 174 that continuously applies a force to the left that, in turn, causes the rod 130 and screw 208 to move the flapper 212 to an open position with respect to the nozzle 98.

The upper end of the plate spring 214 is fixedly connected by means of a screw 216 and a screw retaining plate 218.

Figures 8, 19:
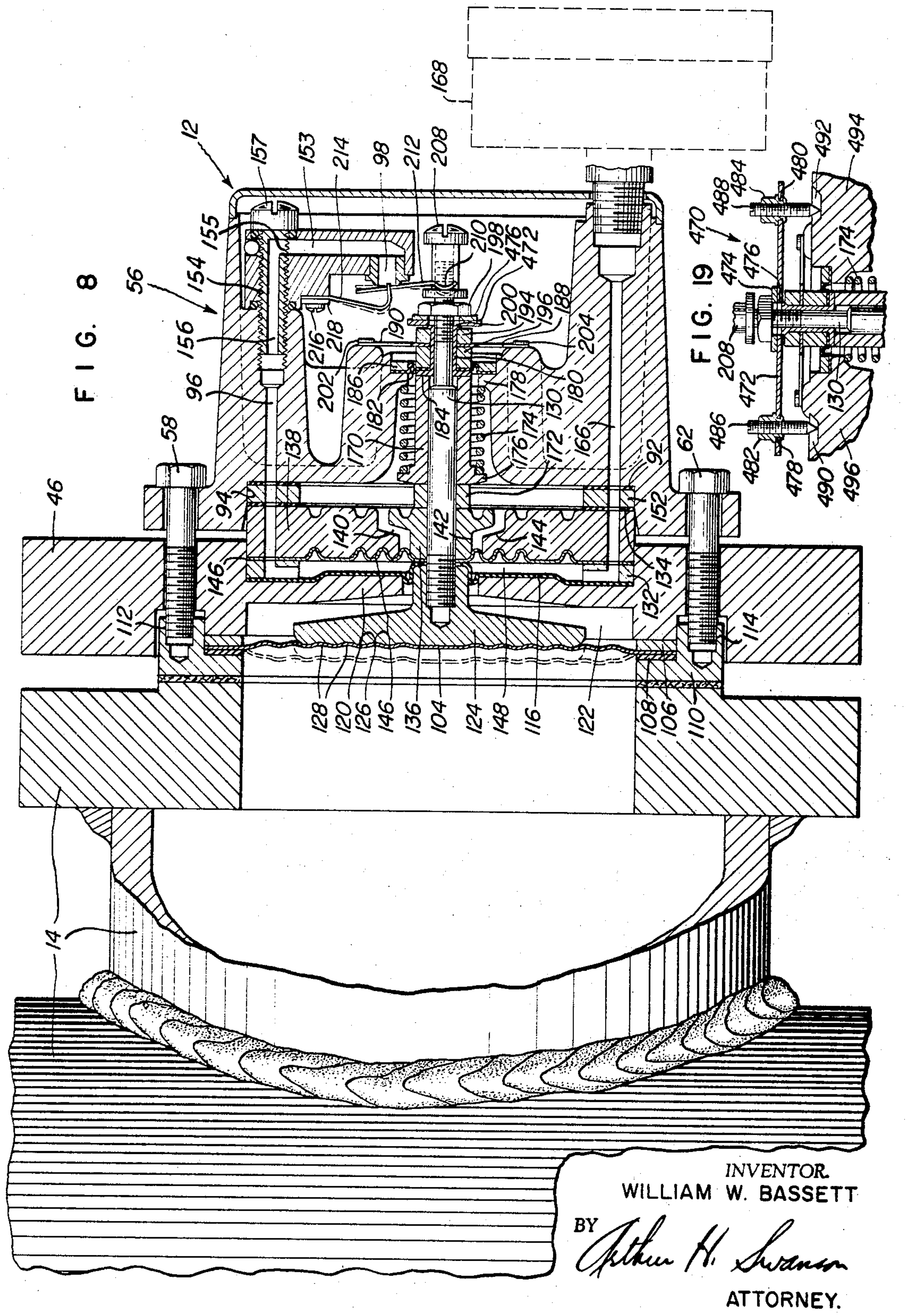
FIG. 8 is a cross-sectional view taken along the line 7—7 of FIG. 4 showing the parts employed in the transmitter when the transmitter is used as a reverse-acting unit.
FIG. 19 shows a partial cross-section of a span adjusting means taken along the line 19—19 of FIG. 4.

The parts of the direct-acting transmitter 12, shown in FIG. 7 and the left and center column of FIGS. 9, 9A, can be readily converted into a reverse-acting transmitter by rearranging its parts in the manner shown in FIG. 8 and in the center and right columns in FIGS. 9, 9A.

To shift from direct-acting to reverse-acting transmitter, it is only necessary to remove bolts 58–64 and restack the parts in the manner shown in the center and right columns in FIGS. 9, 9A.

It can best be seen in FIGS. 9, 9A, that the direct-acting version of the transmitter 12 will contain two identical gasket parts; namely, the second part 92, and the sixth part 134, when it is used as a direct-acting unit.

In the reverse or center and right column position shown in FIGS. 9, 9A it can be seen that the sixth part or gasket 134 used in the direct-acting unit is now shifted to the number four part in the reverse-acting unit. Also, the fourth part of diaphragm 146 used in the direct-acting transmitter is adjusted to the number six part position in the reverse-acting relay.

It can be seen that the third part 152 in FIGS. 9, 9A is used in the positions shown in the left column for direct-acting and is turned over and positioned as shown in the right column of FIGS. 9, 9A when it is used in the reverse-acting transmitter. In a similar manner, it can also be seen that the diaphragm rings identified as the seventh part 132 in the left and right columns of FIGS. 9, 9A are identical to the previously-referred-to third diaphragm ring part 152 shown in the left and right columns of FIGS. 9, 9A.

It should be understood that, since certain parts of the transmitter are used in different positions and in a different manner, the ends of the apertures in those parts not identified in FIGS. 9, 9A by a reference numeral will be sealed off by the surface of other parts of the transmitter with which they are brought into contact.

From the aforementioned description, it can be seen that a transmitter has been constructed which contains many common parts which, because of their unique construction, can readily be assembled to form either a direct or reverse-acting transmitter.

It should be noted that the ring 120, shown as part 9 in FIGS. 9, 9A, is such that it has an end portion of a passageway 220 passing therethrough and the lower end of a roll pin-vent 222 terminating therein. This roll pin 222 passes up through the remaining parts shown in FIGS. 9, 9A which form additional portions of the passageway 220.

This roll pin 222 is, therefore, not only employed to retain the parts of the directly and reversely-assembled part of the transmitter 12, shown in FIGS. 9, 9A, together, but also provides a passageway by which the chamber 122 shown in FIGS. 7 and 8 can be continuously exhausted to atmosphere.

It can also be seen that the plates shown in FIGS. 9, 9A can readily be assembled in their correct position by aligning the triangular mark 224 on plate 132 with a similar triangular mark 226 on plate 46. Additional marks on plates, for example 228–236, are also employed as shown in FIGS. 9, 9A to assist in rapidly aligning the stacked parts of the direct or reverse-acting transmitters in their correct positions.

When it is desired to shift from the direct (FIG. 7) to a reverse-acting (FIG. 8) transmitter, the flapper nozzle 212, 98 and its associated parts are rotated one hundred and eighty (180) degrees from the position shown for the flappers in FIG. 7. The forked end of the flapper is also repositioned on a lower flange portion of the threaded sleeve 208 than that shown in FIG. 7.

The left end surface of the inner and outer diaphragm plates 138, 136 of FIG. 7 are turned around one hundred and eighty (180) degrees so that this surface becomes the right end surface of the plate, as viewed in FIG. 8.

It should also be noted that the ring 172 is assembled to the left of the spring-retaining sleeve 170 in FIG. 8 rather than to the right of the sleeve 170 as was the case with the direct-acting transmitter assembly shown in FIG. 7.

It can be seen that an increase in pressure of the fluid acting against the left outer side surface of the level-sensing diaphragm 104 will cause the rod 130, shown in FIG. 8, to be moved to the right against the bias of spring 174. This action will force the upper end of the flapper to move away from the nozzle 98 exhausting the fluid under pressure therein to atmosphere. This will, in turn, reduce the magnitude of the control pressure being applied in the direction of the arrows by way of passageway 153, 96, chamber 148, passageway 166 to the gage 168.

An alignment pin 238 is shown in FIGS. 9, 9A passing through the passageway 240 for the direct-acting transmitter parts shown in FIG. 7 or the passageway 240 or 242 for the reverse-acting transmitter part shown in FIGS. 9, 9A.

Figure 10:
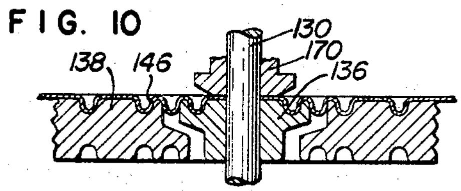
FIG. 10 shows the two separate diaphragm plates in a one hundred and eighty (180) degree flipped-over position from their position shown in FIG. 7 so as to provide the direct-acting version of the transmitter with a higher gain and a wider range.

FIG. 10 shows a different way of mounting the inner diaphragm plate 136 and outer diaphragm plate 138 on the rod 130 than that shown in FIG. 7 so that a greater diametral surface area of the active portion of the diaphragm will be acted upon when an increase in the level of the fluid 16 rises and causes the liquid level sensing diaphragm 104 to move to the right of the position shown in FIG. 7. Placing the diaphragm plates 136, 138 on the rod, as shown in FIG. 10, will thereby enable a greater force to be applied to the rod 130 by way of the diaphragm plate 136 for any given increase in the liquid level of the fluid 16 than that afforded when the diaphragm plates are in the turned-over position shown in FIG. 7.

Figure 10A:
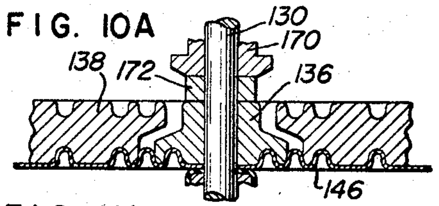
FIG. 10A shows two separate diaphragm plates in a one hundred and eighty (180) degree flipped-over position from their position shown in FIG. 8 so as to provide the reverse-acting version of the transmitter with a higher gain and a wider range.

FIG. 10A shows a different way of mounting the inner diaphragm plate 136 and the outer diaphragm plate 138 on the rod 130 than that shown in FIG. 8 so that a greater diametral surface area of the active portion of the diaphragm will be acted upon when an increase in the level of the fluid 16 rises and causes the liquid level sensing diaphragm 104 to move to the right of the position shown in FIG. 8. Placing the diaphragm plates 136, 138 on the rod, as shown in FIG. 10A, will thereby enable a greater force to be applied to the rod 130 by way of the diaphragm plate 136 for any given increase in the liquid level of the fluid 16 than that afforded when the diaphragm plates are in the turned-over position shown in FIG. 8.

Figure 11:
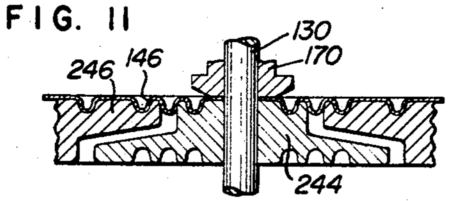
FIG. 11 shows two different size diaphragm plates from that shown in FIGS. 7 and 10 so as to provide the transmitter with a still higher gain and wider range than previously mentioned.

FIG. 11 shows two diaphragm plates 244, 246 that can be substituted for the diaphragm plates 136, 138 shown in FIG. 7 and FIG. 10. It can be seen that the size of the diaphragm plates 244, 246 will provide a different gain for the transmitter than that provided through the use of the different size diaphragm plates 136, 138 shown in FIG. 10.

Figure 11A:
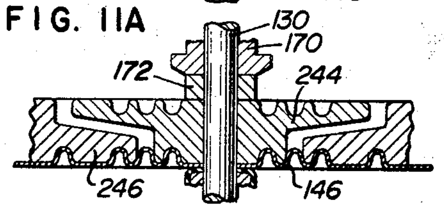
FIG. 11A shows two different size diaphragm plates from those shown in FIGS. 8 and 10A so as to provide the transmitter with a still higher gain and wider range than that previously mentioned for the reverse-acting version of the controller.

FIG. 11A shows two diaphragm plates 244, 246 that can be substituted for the diaphragm plates 136, 138 shown in FIG. 8 and FIG. 10A. It can be seen that the size of the diaphragm plates 244, 246 will provide a still different gain for the transmitter than that provided through the use of the different size diaphragm plates 136, 138 shown in FIG. 10A.

Figure 12:
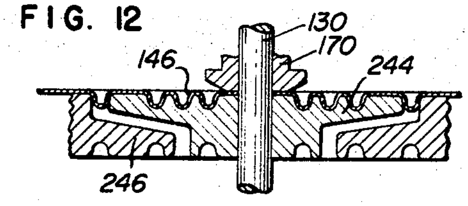
FIG. 12 shows the two different size diaphragm plates in a one hundred and eighty (180) degree flipped-over position from their position shown in FIG. 11 so as to provide the direct-acting version of the transmiter with a still higher gain and wider range.

FIGURE 12 utilizes the diaphragm plates 244, 246 in a flipped over position from their position shown in FIG. 11 to thereby provide a high gain and wider range for the transmitter than is possible with the FIG. 11 arrangement.

Figure 12A:
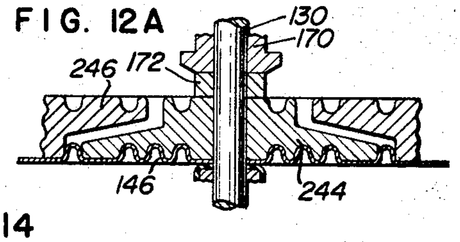
FIG. 12A shows the two separate diaphragm plates in a one hundred and eighty (180) degree flipped-over position from their position shown in FIG. 11A so as to provide the reverse acting version of the transmitter with a still higher gain and wider range.

FIGURE 12A utilizes the diaphragm plates 244, 246 in a flipped over position from their position shown in FIG. 11A to thereby provide a high gain and wider range for the transmitter than is possible with the FIGURE 11A arrangement.

From the aforementioned description of FIGS. 7, 10, 11 and 12, it can be seen that the diaphragm plate arrangement of FIG. 7 will thus provide the transmitter with one water range of operation, for example zero to ten inches; the arrangement of the plates of FIG. 10 with another different range, for example zero to forty inches; the arrangement of the plates of FIG. 11 with still a third range, for example zero to eighty; and the arrangement of the plates of FIG. 12 with a fourth range of operation, for example zero to two hundred inches of water.

Figure 13:
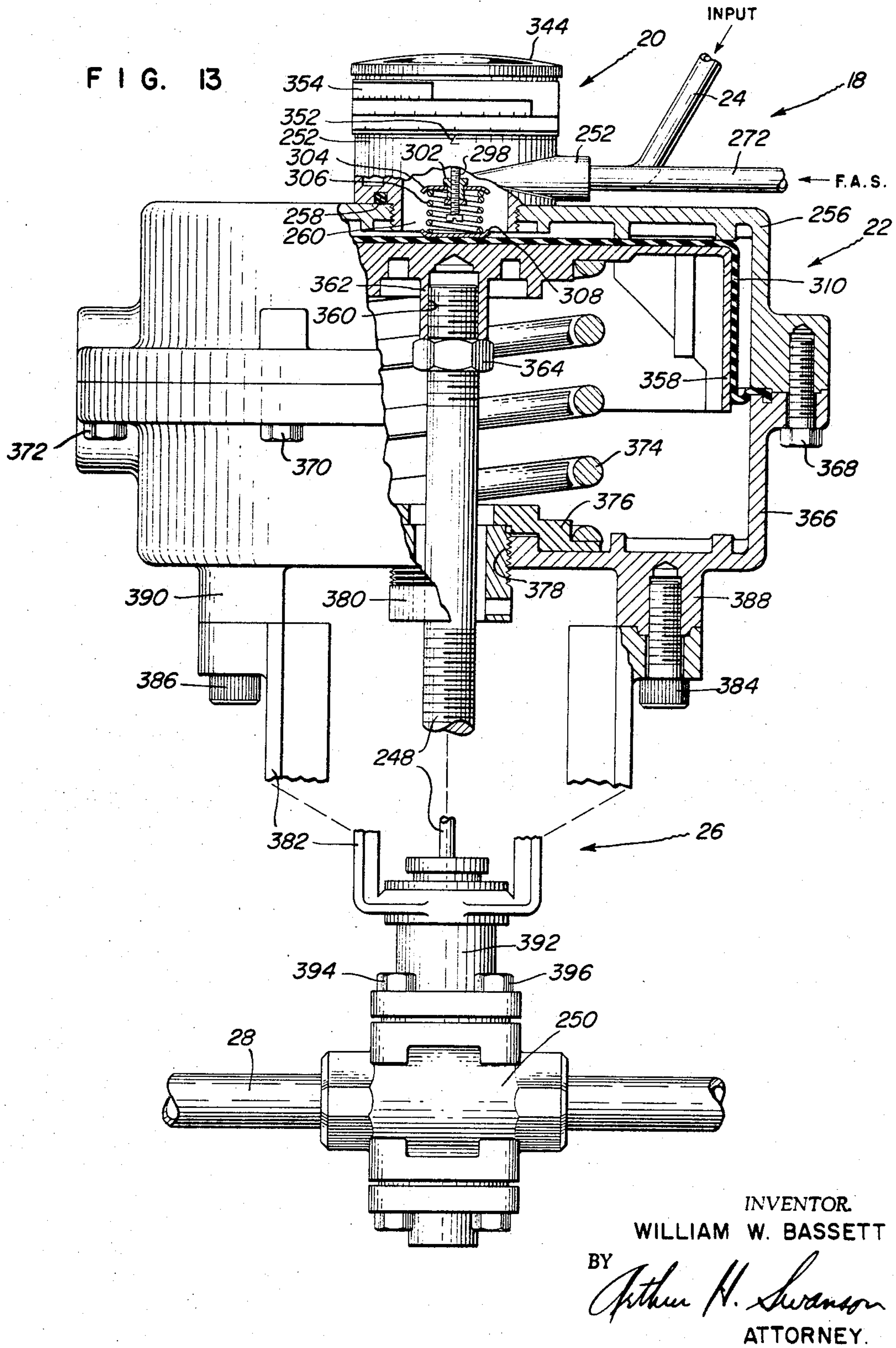
FIG. 13 shows a partial cross-sectional view of the control valve positioning unit used in the direct-acting fluid pressure liquid level regulating apparatus shown in FIG. 1.

FIG. 13 shows the control positioning unit 18 used in the direct-acting fluid pressure liquid level regulating apparatus 10, that is employed in FIG. 1.

The control positioning unit 18 is comprised of a liquid level adjusting unit 20 and an actuator 22 for positioning the stem 248 of a flow control valve 26 within a valve body 250.

Figure 14:
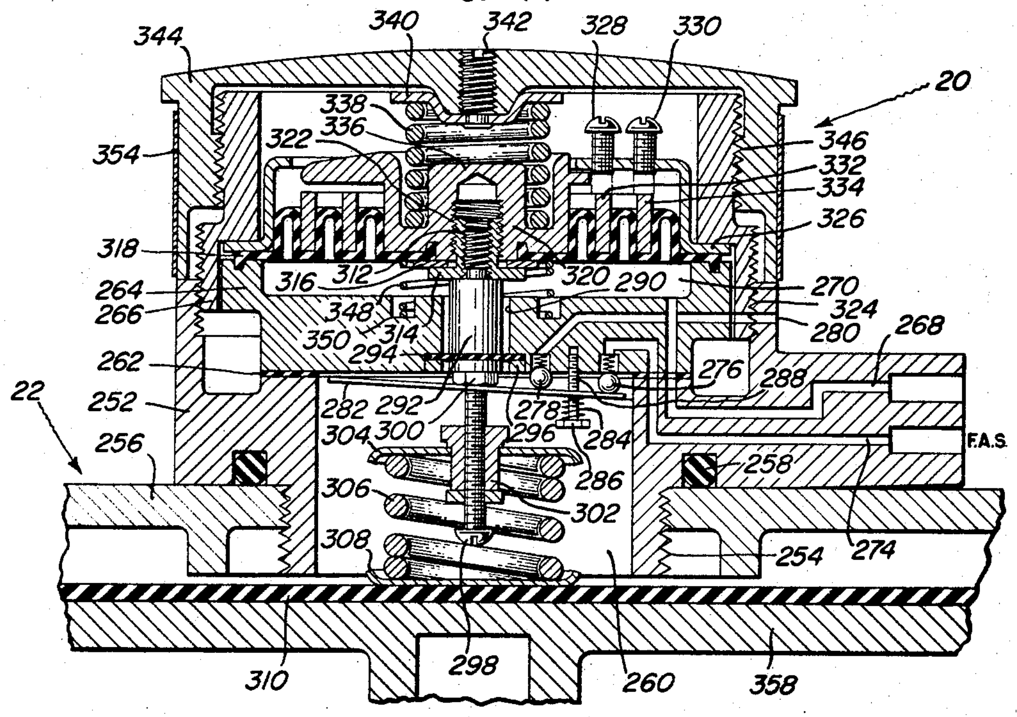
FIG. 14 shows the details of a pneumatic regulator that is used in the control valve positioning unit shown in FIG. 13.

The liquid level adjusting unit 20, as is best seen in detail in FIG. 14, is comprised of a base member 252 that is shown threadedly connected at 254 to the top wall 256 of the actuator 22. The base member 252 is also shown as being retained in fluid-tight engagement with the top surface of the actuator wall 256 by means of an O-ring seal 258 to prevent the pressure in chamber 260 from leaking to the atmosphere surrounding the unit 20.

A gasket 262 is shown acting as a seal between the top surface of the base member 252 and the lower surface of a diaphragm retaining ring 264 that, in turn, is retained in spaced-apart relation with the inner cylindrical wall surface of a central ring portion 266.

FIG. 14 shows, in a more detailed manner than FIG. 13, how the fluid pressure signal produced by the transmitter 12 is applied by way of the conduit 24 and passageway 268 to chamber 270.

FIG. 14 also shows how a filtered air supply (F.A.S.) is applied by way of conduit 272 to passageway 274. A first retaining spring-biased ball check valve 276 is shown positioned at the other end of the passageway 274. A second spring-biased ball check valve 278 is shown at the inner end of the atmospheric exhaust passageway 280. A lever arm member 282 is retained in position against the ball check valves 276, 278 by a spring 284 that surrounds a screw 286 which, in turn, is threadedly retained at 288 in the base of the ring 264.

An aperture is formed by central wall portion 290 of the diaphragm ring 264. A connecting rod 292 passes through the aperture wall portion 290. The connecting rod 292 has attached thereto at its lower periphery flexible diaphragm 294 which is secured through suitable lock nut means 296 to the wall portion 290. The upper end of a screw member 298 is retained in a preselected fixed threadedly-adjusted position in rod 292 by means of the lock nut rod retaining means 300. The lower threaded end of the screw member 298 has a spool-shaped member 302 mounted thereon. This spool member 302, in turn, carries a plate 304 for retaining the spring 306 in an adjustably selected compressed condition against the lower spring retaining plate 308. Plate 308 is, in turn, compressed into engagement with the top surface of the diaphragm 310.

The upper end of the rod 292 is threadedly engaged at 312 with the cylindrical member 314 that, in turn, retains the plate 316 in physical compressed contact with the inner peripheral surface of diaphragm 318. An adjustable nut 320 is shown in threaded engagement at 322 with the upper end of the member 314. The lower surface of the nut 320 is in physical compressed fluid-tight engagement with the upper surface of the diaphragm 318.

The lower outer surface of the previously-mentioned central ring portion 266 is adjustably threaded at 324 so that the substantially cup-shaped diaphragm plate 326 retains the outer peripheral edge of the diaphragm 318 in fluid-tight sealing engagement with the top surface of the diaphragm retaining ring 264.

The upper end of the cup-shaped diaphragm plate 326 contains two range adjusting screw members 328, 330 which, together with other similar pairs of spaced-apart screws, not shown, form two series of screws, each series of which is in a circle about the vertical center line of the unit 20.

Each of the screws on any one of these circles can be adjusted to its dotted-line position so that they either engage the ring 332 or 334 and thereby alter the active diameter of the diaphragm 318 and the range of the unit 20.

The aforementioned adjustment of the screws, thus, determines the transmitter control pressure necessary to move the stem 248 of the actuator and the parts attached thereto through its entire stroke. Decreasing the effective active area of the diaphragm, thus, increases the operating range.

The top surface 336 of the wall of the nut member 320 forms a boss over which the lower end of the set-point adjusting spring 338 is inserted.

The upper end of the spring 338 is held in an adjustably fixed position by the spring retaining plate 340 which, in turn, can be separately positioned by rotating the screw 342 mounted in the knob-shaped cover member 344 or by rotating this cover member so as to adjust its position along the threaded connection 346.

An additional spring 348 has one of its ends positioned in chamber 270 in contact with recess 350 formed in the ring 264 so its other end can urge the diaphragm 318 upward against the bias of spring 338.

The outer surface of the base member 252 of unit 18 shown in FIGS. 13 and 14 is provided with a stationary triangular-shaped indicator 352. The lower rotatable outer peripheral surface of the cover member 344 is provided with, as an example, a thirty percent, fifty percent, and one hundred percent proportional band direct-acting and reverse-acting indicating scale 354, such as that shown in detail in FIG. 17.

Figure 17:
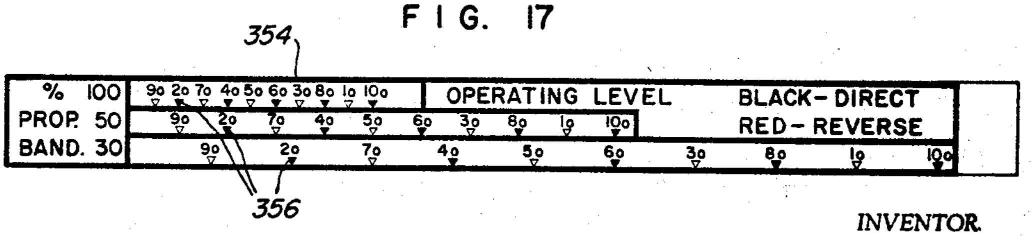
FIG. 17 shows an expanded view of an indicating plate which contains a plurality of proportional band indicating scales thereon that is mounted on an upper outer, cylindrical, rotating, knob-shaped surface of a pneumatic relay shown in FIGS. 14 and 16.

The markings formulating this indicating scale 354 can either be inscribed directly on the outer surface of the cover member 344 or be made in the form of a white-colored tape 354 having an adhesive surface on its non-indicating side, shown in FIG. 17. All of the lines, indicating marks, numbers and letters on this tape 354 are of a black color, with the exception of the words RED-REVERSE and all of the filled-in triangular indicator marks and the numbers immediately above these marks 356 which are made of another different color such as red.

When it is desired to set the liquid level adjusting unit 20 to operate on any one of the three selected proportional band scales, it is only necessary to rotate the cover member 344 so that the hollow or filled-in black triangle adjacent to the percentage mark of operating level desired on the selected proportional band scale is aligned with the point of the triangle on the stationary indicator 352. It should be understood that any one of the three lines of the filled-in black-colored triangles and numbers is selected for alignment with the stationary triangle 352 in the aforementioned manner when the unit 20 is employed as a direct-acting unit.

It should be further understood that any one of the three lines of the hollow red-colored triangles and numbers is selected in the aforementioned manner for alignment with the stationary triangle 352 when the unit 20 is employed as a reverse-acting unit.

It can be seen that rotation of the cover member 344 changes the preload on the diaphragm 318 created by the spring 338. Any increase in the previously-described output control pressure being generated by the transmitter shown in FIGS. 1 and 7 will be applied by way of conduit 24 and passageway 268 to chamber 270 of the direct-acting (FIG. 13) version of the liquid level regulating device 12. Application of the control pressure to chamber 270 in this manner will thus cause the diaphragm 318 (FIG. 14) and the rod 292 to be moved in an upward direction.

When the output control pressure of the transmitter increases, the pressure is transmitted to chamber 270 and a force is created under the diaphragm 318. When this force overcomes that of the spring 338, the range spring 306 forces the center lever 282 up. The ball 278 at the exhaust port becomes the fulcrum and the ball check 276 is opened to the filtered air supply (F.A.S.) under pressure in passageway 274. This air pressure forces the diaphragm 310 and diaphragm plate 358 down. The actuator travel continues until expansion of the range spring 306 balances the force on the lever 282 closing the air supply pressure ball check valve 276.

When the supply pressure level of the control pressure of the transmitter decreases, the lever 282 opens the exhaust ball check 278 and the actuator spring 306 moves the valve stem 248 up. This travel continues until the forces are again in balance.

FIG. 13 shows the upper end of the stem 248 of the actuator 22 threadedly connected at 360 to a centrallylocated sleeve portion 362 to the cup-shaped diaphragm plate 358. A jam nut 364 is employed to retain the stem in tight fitted engagement with the sleeve portion 362.

The top and bottom facing portions 256, 366 are bolted together by a suitable number of spaced-apart tap bolts, for example 368, 370, 372, that are shown retaining the outer peripheral edge of the diaphragm 310 therebetween.

A spring 374 is positioned within the casing portions 256, 366 to maintain the diaphragm plate 358 and diaphragm 310 in the positions shown when the pressure in chamber 260 is insufficient to move the spring in a downward direction. The top end of the spring 374 is shown in direct contact with the inside surface of the diaphragm plate 358, and its lower end is retained in a stationary position by an embossed circular plate 376 against the inner wall surface of the casing portion 366. An inner wall portion of the casing 366 is shown threadedly connected at 378 to a sleeve member 380. The top surface of the sleeve member 380 supports the circular spring support plate 376. This construction enables the sleeve member 380 to be rotated in an upward direction to place the spring 374 in a greater initial compressed state than that shown in FIG. 13.

A yoke 382 is threadedly connected at its upper end by means of two tap bolt connecting means 384, 386 to associated embossed portions 388, 390 which, in turn, form an integral part of the lower portion of the casing 366. The lower end of the yoke 382 is connected to a flange casing part 392 that, in turn, is bolted by means of the threaded connecting means 394, 396 to the valve body 250.

Figure 15:
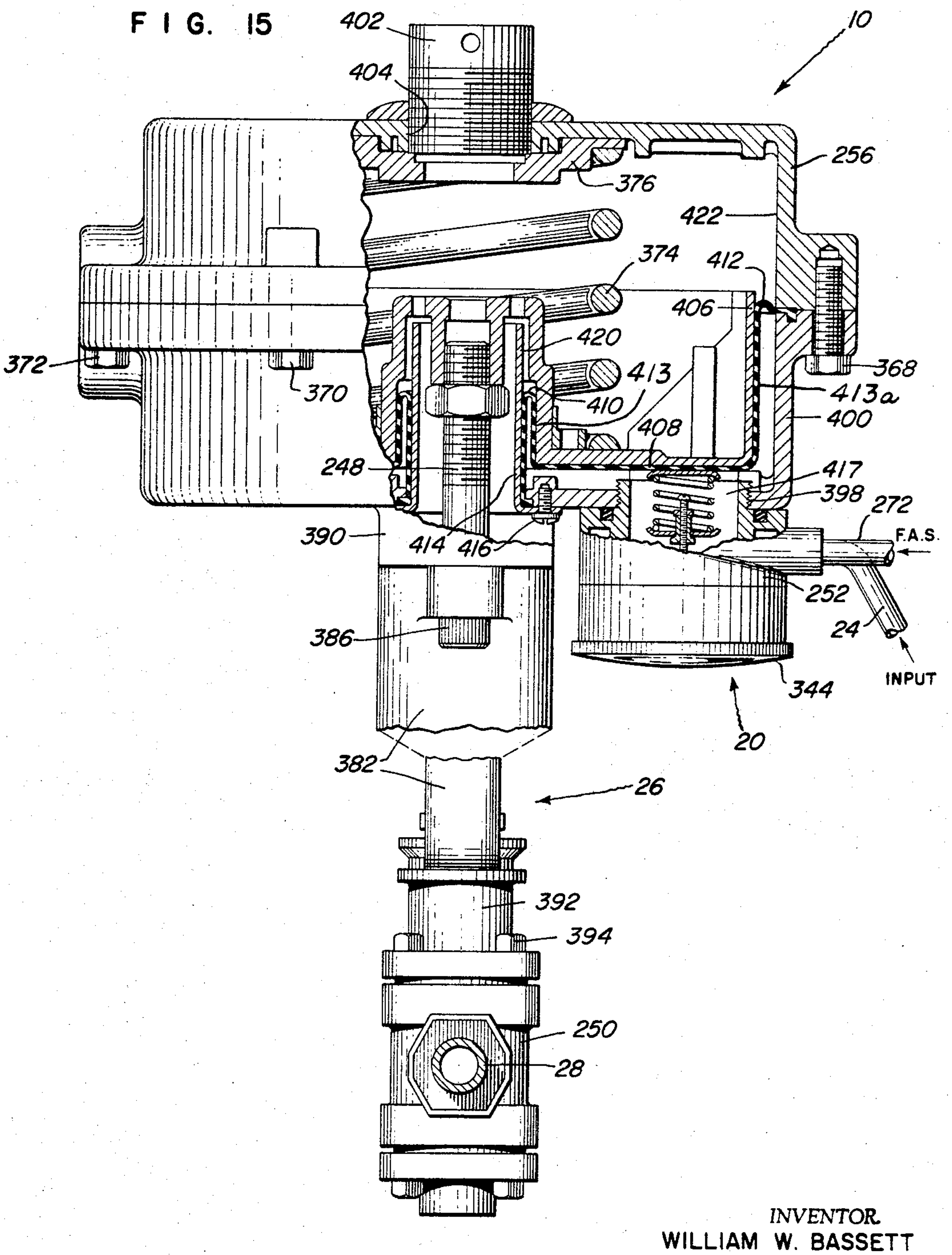
FIG. 15 shows in partial cross-sectional view an actuator construction which can be substituted for the actuator shown in FIG. 13 and FIG. 1 when the transmitter shown in FIG. 1 is assembled to provide reverse action.

When it is desired to employ the liquid level regulating apparatus 10, shown in FIGS. 13 and 14, as a reverse-acting unit the unit 20 is removed from the top casing portion 256 of the actuator and is threadedly mounted at 398 in a lower casing portion 400, as is shown in FIG. 15.

Another change that is made when shifting the unit 20 from the direct-acting position shown in FIG. 1 and FIG. 13 to a reverse-acting position, shown in FIG. 15, is the threading of a plug 402 into the threaded portion 404 of the upper casing 256 from which the liquid level regulator unit 20 was removed. The embossed circular plate 376 is positioned at the top of the spring 374 when the liquid level regulating apparatus 10 is used as a reverse-acting unit, such as is shown in FIG. 15.

The type of diaphragm plate 406, the diaphragm 408 which has inner and outer convolutions 410 and 412, the cylindrical sleeve 414 and the threaded means 416 for retaining the sleeve 414 in a fixed position on the lower casing portion 400 are of the same construction as that disclosed in the Robert Schmitz application, Ser. No. 260,542, filed on Feb. 25, 1963, now Patent Number 3,180,235.

With the reverse-acting actuator construction shown in FIG. 15, it can be seen that any increase in pressure supplied by the liquid level regulating unit 20 to the chamber 417 will cause the inner and outer convolutions 410 and 412 of the diaphragm 408 to roll off of the inner and outer surfaces 413, **413*a* of the diaphragm plate 406 and simultaneously roll on to the respective outer surface 420 of the sleeve 414 and the inner surface 422 of the upper casing portion 256**.

Figure 16:
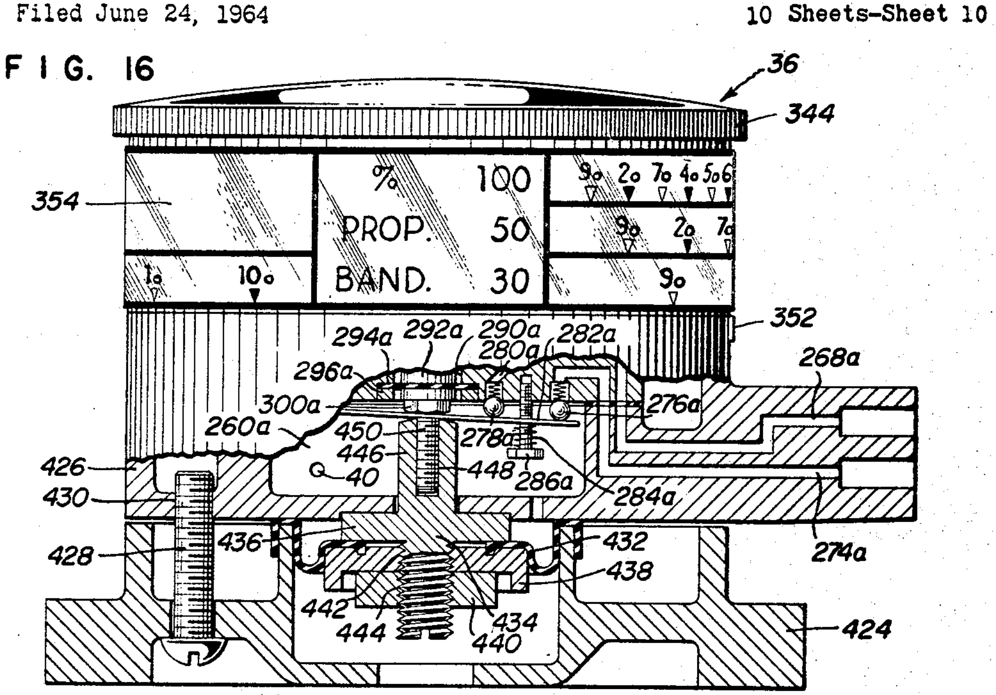
FIG. 16 shows the details of a pneumatic relay that is used with the second and third control valve positioning unit shown in FIGS. 2 and 3.

FIG. 16 shows a liquid level adjusting unit 36 that has a base support plate 424 that can be mounted on the outer embossed wall surface of the transmitter **12*a*** as shown in FIG. 2.

As is best shown in FIG. 16, the base support plate 424 supports a base member 426 thereon which is of substantially the same construction as the base member 252 shown in FIG. 14. One or more of the screw connecting means 428, threadedly connected at 430 to base member 426, is employed to retain the outer physical surfaces of the diaphragm 432 in fluid-tight engagement between the base support member 424 and the base member 426.

A connecting rod 434 is shown passing through an opening in the central portion of the diaphragm 432 having a circular diaphragm plate 436 formed integral therewith and which is positioned on the top surface of the diaphragm 432.

A second diaphragm plate 438 and a flange retaining nut 440 are shown joined by a threaded connection 442, 444 to the lower end of the connecting rod 434. This construction thus enables the diaphragm plate 436, 438 to be brought into fluid-tight engagement with the diaphragm 432.

The central upper end 446 of the rod 434 is shown in threaded engagement at 448 with a second threaded rod connection 450. The upper end of the threaded rod 450 is threadedly connected by the lock nut rod retaining means 300*a* to a third connecting rod 292*a* in a manner similar to that previously described for the screw member 298 in FIG. 14. The parts 268*a*, 274*a*, 276*a*, 278*a*, 280*a*, 282*a*, 284*a*, 286*a*, 290*a*, 292*a*, 294*a*, 296*a*, 300*a* are identical to the related parts identified as 268–296 and 300 in FIG. 14. Furthermore, it should be understood that all of the remaining parts that are disclosed within the confines of the knob-shaped cover member 344 in FIG. 14 are also retained within the confines of the knob-shaped cover member 344 shown in FIG. 16.

It can be seen that the diaphragm 432 of FIG. 16 provides a feedback force applying means in that an increase in the pressure of the F.A.S., filtered air supply, that is applied to the chamber 260*a* will cause the diaphragm of the connecting rods 434, 450, 292 to be moved in a downward direction combating the movement of the rod in an upward direction that is caused by an increase in the central pressure signal being sent to the liquid level adjusting unit 36 by the transmitter 12*a* and by way of the conduit 38 as is shown in FIG. 2.

Figure 18:
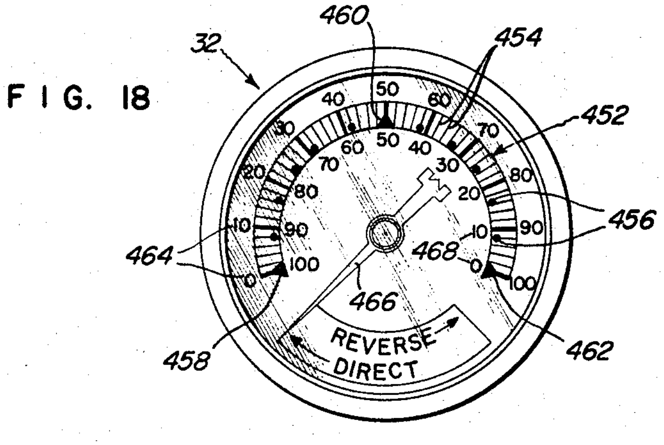
FIG. 18 shows the face of a liquid level indicating gage that is used with both the direct and reverse-acting transmitter.

FIG. 18 shows the gage 32 as having a white indicating dial 452 made of black-colored indicating lines 454, dots 456 and triangles 458, 460, 462. The space between any one triangle 458, 460, 462 and an adjacent dot 456 or between adjacent dots 456, 456 represents a one (1) p.s.i. change in indication. The space in between adjacent triangles 458, 460, 462 represents a six (6) p.s.i. change in indication.

It can be seen that the members 464 on the outer scale, the word DIRECT and the arrow pointing in the clockwise direction are also of a black color. The position of the pointer 466 directed toward the numbers on the scale 454 will directly indicate the level of liquid 16 in the tank 14 when the liquid level regulator apparatus 10 employs a direct-acting transmitter 12 shown in FIG. 7 and a direct-acting actuator 22 shown in FIG. 13 and FIG. 1.

It can also be seen that the members 458 on the inner scale, the word REVERSE and the arrow pointing in the counter-clockwise direction are of another color such as red. The position of the pointer 466 following the numbers on the scale 454 will directly represent the level of the liquid 16 in the tank 14 when the liquid level regulator apparatus 10 employs a reverse-acting transmitter such as that shown in FIG. 8 and a reverse-acting actuator such as that shown in FIG. 15.

In the direct acting liquid level (FIG. 1) regulating system the force balance transmitter 12 of FIG. 7 is provided which senses the liquid level in an open tank by the force (pressure times area) exerted on the sensor diaphragm 104. An opposing pneumatic pressure balances head pressure through a rebalancing diaphragm 146 at the designated setpoint which is determined by the force resulting from the adjustment of spring 338 and the diaphragm 318 in regulating unit 20 until the output pressure from the transmitter is opposite to the force applied by the setpoint central spring 338. An increase in head pressure of the liquid under measurement acting on the sensor diaphragm 104 increases the air pressure in the liquid level setpoint adjusting unit 20 and drives the actuator stem 248 down to open the reverse acting control valve 26. While the stem 248 of reverse acting control valve 26 is moved downward its plug will open to allow a more rapid rate of drain of the fluid 16 through the drain conduit 28. A decrease in head pressure of the liquid under measurement acting on the sensor diaphragm 104 causes an opposite action to occur that will close the control valve 26 and the liquid in the tank 14 will regain its proper level.

The transmitter can be field converted from a direct-acting unit (FIG. 7) to a reverse-acting unit (FIG. 8) in which an air-to-open system operation is achieved, but using a reverse-acting actuator or valve such as that shown in FIG. 15. In this air-to-open system, an increase in level of the liquid 16 causes a decreased air signal to the liquid level regulating unit 10 and the opening of the reverse acting control valve 26 shown in FIG. 15. While the stem 248 of the reverse acting valve 26 is moved downward the plug of this valve will open to allow a more rapid rate of drain of the fluid 16 through the drain conduit 28.

FIG. 19 shows a span adjusting means 470 for affording any one of a number of preselected span adjusting forces to the rebalancing diaphragm 146 in a direction that will oppose a preselected magnitude of force being applied to the pressure sensing diaphragm 104 against which the pressure of the liquid 16 within the vessel 14 is applied.

The aforementioned span adjusting means 470 is comprised of an elongated plate 472 having a bored-out wall portion forming an aperture 474 in the central portion thereof for mounting it on the shaft 130. A washer 476 is shown in FIG. 19 retaining the central portion of the plate 472 in non-flexible relation with the shaft 130. The right and left end portions of the plate 472 have apertured wall portions 478, 480. Each of the apertured wall portions 478, 480 is provided with an internally-threaded sleeve insert 482 or 484 that is fixedly retained by peening its lower surface to the underside of the plate 472. Each insert 482, 484 is shown in FIG. 19 as having a screw member 486, 488 passing therethrough and being in threaded engagement therewith.

The lower end of each of the screw members 486, 488 is of a cone-shaped configuration and is shown in FIG. 19 in engagement with associated V-shaped slot members 490, 492 that are formed in the rib members 494 and 496 of the transmitter casing 56.

It can be seen from the aforementioned description of the span adjusting means 470 that rotation of the screw members 486, 488 will cause the plate 472 to apply a spring force to the shaft 130 to move it and its associated plate 124 into or out of closer contact with the sensing diaphragm 104.

The positioner-liquid level regulating apparatus 10 is initially set to one of three proportional bands, for example thirty, fifty, one hundred, depending on the valve travel that is desired. This proportional band can be changed by adjusting a series of screws, for example 328, 330 shown in FIG. 14, inside the rotating head member 344 to vary the diaphragm area which the liquid level regulating spring 338 must overcome. Proportional bands other than the three supplied can be obtained by removing the feedback spring 306 and replacing it with a spring that possesses a different spring gradient characteristic.

Setpoint is established by rotating the knob-shaped cover of the liquid level regulating unit to line up the desired percent of level with a stationary triangular indicator 352. Direction of rotation is used to vary the compression of the setpoint spring 338, fixing the setpoint at a precise setting.

The unique liquid level regulating apparatus described herein provides:

(1) Fast and accurate control of a fluid in an open tank, (2) A reduction in the expense of manufacturing and, hence, a cost reduction to the purchaser through the reduction of the number of different parts that have heretofore been required by liquid level regulating units when converting these prior units from a direct to a reverse-acting unit, and vice versa, (3) Three proportional bands plus a rotatable setpoint adjusting knob for permitting rapid system start-up with easily regulated liquid level at the transmitter or at any intermediate station or at the actuator, (4) A three proportional band relationship built into a liquid level regulating unit which construction requires only a single liquid level setpoint adjustment rather than the conventional trial and error liquid level adjusting procedure that has heretofore been required to effect a desired level control of a fluid in an open tank, and (5) The accommodation of liquid level indicating instruments such as indicating gages for directly indicating the level of a fluid at the transmitter at an intermediate station or immediately adjacent the actuator.

What is claimed is:

1. A fluid pressure transmitter, comprising a series of chambers including a first chamber open to atmospheric pressure and having a flexible wall thereof constructed to produce movement in response to the application of pressure thereto, a second flexible wall forming an opposite end surface of the first chamber, a second chamber adjacent the first chamber having opposite wall portions formed by the second flexible wall and a third flexible wall, separate passageways adapted to transmit an output fluid pressure signal generated by the transmitter into and out of the second chamber, a third chamber formed by the third flexible wall and an opposite fourth flexible wall, said third chamber being connected by a passageway to atmospheric pressure, a mechanical operating connection positioned to extend through a central wall portion of the second, third and fourth flexible walls into the first chamber at one end and positioned to extend out of the third chamber at its other end, a plate positioned in the first chamber and operably connected to transmit movement of the first flexible wall to said mechanical connection, a stationary outer ring-shaped plate positioned within the second chamber, an associated ring-shaped plate positioned in spaced relation within the second-mentioned plate and being operably connected for movement with the mechanical connection, a biasing means positioned in the third chamber to apply a preselected force to the mechanical connection in a direction that will oppose a preselected magnitude of the force being applied to the mechanical connection by way of the first flexible wall, a bleed valve positioned adjacent said other end of the mechanical connection to generate the output fluid pressure signal and a spring-biased mechanical link operably connected at one end for movement with the mechanical operating connection and at its other end to the valve to regulate the magnitude of the output fluid pressure being transmitted by way of the aforementioned passageway to and from the second chamber.

2. A fluid pressure transmitter, comprising a series of chambers including a first chamber open to atmospheric pressure and having a flexible wall thereof constructed to produce movement in response to the application of pressure thereto, a second flexible wall forming an opposite end surface of the first chamber, a second chamber adjacent the first chamber having opposite wall portions formed by the second flexible wall and a third flexible wall and containing a passageway connecting the second chamber to atmospheric pressure, a third chamber formed adjacent the second chamber having opposite wall portions formed by the third flexible wall and a fourth flexible wall, separate passageways adapted to transmit an output fluid pressure generated by the transmitter into and out of the third chamber, a mechanical operating connection positioned to extend through a central wall portion of the second, third and fourth flexible walls into the first chamber at one end and out of the third chamber at its other end, a plate positioned in the first chamber and operably connected to transmit movement of the first flexible wall to said mechanical connection, a stationary outer ring-shaped plate positioned within the second chamber, an associated ring-shaped plate positioned in spaced relation within the first-mentioned plate and being operably connected for movement with the mechanical connection, a biasing means positioned within the third chamber to apply a preselected force to the mechanical connection in a direction that will oppose a preselected magnitude of the force being applied to the mechanical connection by way of the first flexible wall, a bleed valve positioned adjacent the other end of the spring-biased mechanical link operably connected at one end for movement with the mechanical operating connection and at its other end to the valve to regulate the magnitude of the output fluid pressure being transmitted by way of the aforementioned passageway to and from the third chamber.

3. A unitary direct-reverse acting force balance transmitter for generating an output pressure, comprising a first flexible diaphragm constructed to produce movement in response to the application of pressure thereto, a rebalancing flexible diaphragm spaced from the first flexible diaphragm, a diaphragm plate in physical contact with one side of the rebalancing diaphragm, a spring positioned to apply a force to the rebalancing diaphragm that opposes the movement of the first flexible diaphragm, a fluid pressure valve regulating means constructed for selective retention in a direct or a reverse operating position and for joint movement with the first and second-mentioned diaphragms, said valve regulating means being operable when positioned in a first one of the operating positions to produce an output fluid pressure of increasing magnitude on one side of the rebalancing diaphragm upon an increase in the magnitude of the pressure applied to the first flexible diaphragm, the rebalancing diaphragm being positioned on the other side of the diaphragm plate when the valve regulating means is retained in its other position and said valve regulating means being further operable when retained in its other position to produce an output fluid pressure of decreasing magnitude on the rebalancing diaphragm upon an increase in the magnitude of the pressure applied to the first flexible diaphragm.

4. A transmitting unit for a direct-reverse acting liquid level regulating apparatus, comprising a pressure sensing diaphragm adapted to form a part of the side wall of a liquid-filled vessel, a rebalancing diaphragm connected for joint movement with the first-mentioned diaphragm, a bleed valve operably connected when in a first operating position for movement with the diaphragms to produce an output pressure signal of increasing magnitude upon an increase in the magnitude of the liquid level in the vessel, and said bleed valve being further operably connected when in a second opposite operating position for movement with the diaphragms to produce an output pressure signal of decreasing magnitude upon an increase in the magnitude of the liquid level in the vessel.

5. The transmitting unit as defined in claim 4, wherein an adjustable biasing means is employed to apply any one of a number of span adjusting forces to the rebalancing diaphragm in a direction that will oppose a preselected magnitude of force being applied to the pressure sensing diaphragm against which the pressure of the liquid within the vessel is applied.

6. The transmitting unit as defined in claim 4, wherein a biasing means is positioned to apply a preselected force to the rebalancing diaphragm in a direction that will oppose a preselected magnitude of force being applied to the pressure sensing diaphragm against which the pressure of the liquid within the vessel is applied, the rebalancing diaphragm and a third diaphragm providing a chamber into which the output pressure signal is applied and in which chamber the biasing means is positioned when the transmitter is constructed to act as a direct-acting unit.

7. The transmitting unit as defined in claim 4, wherein a biasing means is positioned to apply a preselected force to the rebalancing diaphragm in a direction that will oppose a preselected magnitude of force being applied to the pressure sensing diaphragm against which the pressure of the liquid within the vessel is applied, the rebalancing diaphragm and a third diaphragm providing a chamber into which the output pressure signal is applied and in which chamber the biasing means is positioned when the transmitter is constructed to act as a direct-acting unit, the rebalancing diaphragm and a fourth diaphragm providing a chamber into which the output pressure signal is applied when the transmitter is constructed to act as a reverse-acting unit.

8. The transmitting unit as defined in claim 4, wherein a biasing means is positioned to apply a preselected force to the rebalancing diaphragm in a direction that will oppose a preselected magnitude of force being applied to the pressure sensing diaphragm against which the pressure of the liquid within the vessel is applied, the rebalancing diaphragm and a third diaphragm providing a chamber into which the output pressure signal is applied and in which chamber the biasing means is positioned when the transmitter is constructed to act as a direct-acting unit, the rebalancing diaphragm and a fourth diaphragm providing a chamber into which the output pressure signal is applied when the transmitter is constructed to act as a reverse-acting unit, the face surfaces of the rebalancing diaphragm being provided with a plurality of convolutions of ring-shaped construction, a diaphragm plate containing complementary ring-shaped grooves on opposite face surfaces thereof, the convolutions in the diaphragm being positioned to engage the grooves on one side of the diaphragm plate when the transmitter is operated as a direct-acting unit and the diaphragm convolutions being operable to engage the grooves on the opposite side of the diaphragm plate when the transmitter is operated as a reverse-acting unit.

9. The transmitting unit as defined in claim 4, wherein a biasing means is positioned to apply a preselected force to the rebalancing diaphragm in a direction that will oppose a preselected magnitude of force being applied to the pressure sensing diaphragm against which the pressure of the liquid within the vessel is applied, the rebalancing diaphragm and a third diaphragm providing a chamber into which the output pressure signal is applied and in which chamber the biasing means is positioned when the transmitter is constructed to act as a direct-acting unit, the rebalancing diaphragm and a fourth diaphragm providing a chamber into which the output pressure signal is applied when the transmitter is constructed to act as a reverse-acting unit, the face surfaces of the rebalancing diaphragm being provided with a plurality of convolutions of ring-shaped construction, a diaphragm plate containing complementary ring-shaped grooves on opposite face surfaces thereof, the convolutions in the diaphragm being positioned to engage the grooves on one side of the diaphragm plate when the transmitter is operated as a direct-acting unit, the diaphragm convolutions being operable to engage the grooves on the opposite side of the diaphragm plate when the transmitter is operated as a reverse-acting unit, each face of the diaphragm plate being constructed to provide a different area than its opposite face and one of the faces of the diaphragm plate being operably constructed to provide a first selected area in contact with its associated diaphragm when in one position and the other face of the diaphragm plate being operably constructed to provide a second different selected area in contact with its associated diaphragm when in another position.

10. The transmitting unit as defined in claim 4, wherein a biasing means is positioned to apply a preselected force to the rebalancing diaphragm in a direction that will oppose a preselected magnitude of force being applied to the pressure sensing diaphragm against which the pressure of the liquid within the vessel is applied, the rebalancing diaphragm and a third diaphragm providing a chamber into which the output pressure signal is applied and in which chamber the biasing means is positioned when the transmitter is constructed to act as a direct-acting unit, the rebalancing diaphragm and a fourth diaphragm providing a chamber into which the output pressure signal is applied when the transmitter is constructed to act as a reverse-acting unit, the face surfaces of the rebalancing diaphragm being provided with a plurality of convolutions of ring-shaped construction, two spaced-apart diaphragm plates containing complementary ring-shaped grooves on opposite face surfaces thereof, the convolutions in the diaphragm being positioned engage the grooves on one side of the diaphragm plates when the transmitter is operated as a direct-acting unit, and the diaphragm convolutions being operable to engage the grooves on the opposite side of the diaphragm plates when the transmitter is operated as a reverse-acting unit.

11. The transmitting unit as defined in claim 4, wherein a biasing means is positioned to apply a preselected force to the rebalancing diaphragm in a direction that will oppose a preselected magnitude of force being applied to the pressure sensing diaphragm against which the pressure of the liquid within the vessel is applied, the rebalancing diaphragm and a third diaphragm providing a chamber into which the output pressure signal is applied and in which chamber the biasing means is positioned when the transmitter is constructed to act as a direct-acting unit, the balancing diaphragm and a fourth diaphragm providing a chamber into which the output pressure signal is applied when the transmitter is constructed to act as a reverse-acting unit, the face surfaces of the rebalancing diaphragm being provided with a plurality of convolutions of ring-shaped construction, two spaced-apart diaphragm plates containing complementary ring-shaped grooves on opposite face surfaces thereof, the convolutions in the diaphragm being positioned to engage the grooves on one side of the diaphragm plates when the transmitter is operated as a direct-acting unit, the diaphragm convolutions being operable to engage the grooves on the opposite side of the diaphragm plates when the transmiter is operated as a reverse-acting unit, each face of each diaphragm plate being constructed to provide a different area than its opposite face and one of the faces of each of the diaphragm plates being operably constructed to provide a first selected area in contact with its associated diaphragm when in one position and the other faces of each of the diaphragm plates being operably constructed to provide a second different selected area in contact with its associated diaphragm when in another position.

12. A transmitting unit for a direct-reverse acting liquid level regulating apparatus, comprising a pressure sensing diaphragm adapted to form a part of the side wall of a liquid-filled vessel, a rebalancing diaphragm connected for joint movement with the first-mentioned diaphragm, a bleed valve operably connected when in a first operating position for movement with the diaphragms to produce an output pressure signal of increasing magnitude upon an increase in the magnitude of the liquid level in the vessel, said bleed valve being further operably connected when in a second opposite operating position for movement with the diaphragm to produce an output pressure signal of decreasing magnitude upon an increase in the magnitude of the liquid level in the vessel, and the face surfaces of the force balancing diaphragm being provided with a plurality of convolutions of ring-shaped construction, a diaphragm plate containing complementary ring-shaped grooves on opposite face surfaces thereof, the convolutions in the diaphragm being positioned to engage the grooves on one side of the diaphragm plate when the transmitter is operated as a direct-acting unit and the diaphragm convolutions being operable to engage the grooves on the opposite side of the diaphragm plate when the transmitter is operated as a reverse-acting unit.

13. A transmitting unit for a direct-reverse acting liquid level regulating apparatus, comprising a pressure sensing diaphragm adapted to form a part of the side wall of a liquid-filled vessel, a rebalancing diaphragm connected for joint movement with the first-mentioned diaphragm, a bleed valve operably connected when in a first operating position for movement with the diaphragms to produce an output pressure signal of increasing magnitude upon an increase in the magnitude of the liquid level in the vessel, said bleed valve being further operably connected when in a second opposite operating position for movement with the diaphragm to produce an output pressure signal of decreasing magnitude upon an increase in the magnitude of the liquid level in the vessel, and the face surfaces of the force balancing diaphragm being provided with a plurality of convolutions of ring-shaped construction, a diaphragm plate containing complementary ring-shaped grooves on opposite face surfaces thereof, the convolutions in the diaphragm being positioned to engage the grooves on one side of the diaphragm plate when the transmitter is operated as a direct-acting unit and the diaphragm convolutions being operable to engage the grooves on the opposite side of the diaphragm plate when the transmitter is operated as a reverse-acting unit, each face of the diaphragm plate being constructed to provide a different area than its opposite face and one of the faces of the diaphragm plate being operably constructed to provide a first selected area in contact with its associated diaphragm when in one position and the other face of the diaphragm plate being operably constructed to provide a second different selected area in contact with its associated diaphragm when in another position.

14. A transmitting unit for a direct-reverse acting liquid level regulating apparatus comprising a pressure sensing diaphragm adapted to form a part of the side wall of a liquid-filled vessel, a rebalancing diaphragm connected for joint movement with the first-mentioned diaphragm, a bleed valve operably connected when in a first operating position for movement with the diaphragms to produce an output pressure signal of increasing magnitude upon an increase in the magnitude of the liquid level in the vessel, said bleed valve being further operably connected when in a second opposite operating position for movement with the diaphragm to produce an output pressure signal of deceasing magnitude upon an increase in the magnitude of the liquid level in the vessel, and the face surfaces of the force balancing diaphragm being provided with a plurality of convolutions of ring-shaped construction, two spaced-apart diaphragm plates containing complementary ring-shaped grooves on opposite face surfaces thereof, the convolutions in the diaphragm being positioned to engage the grooves on one side of the diaphragm plates when the transmitter is operated as a direct-acting unit and the diaphragm convolutions being operable to engage the grooves on the opposite side of the diaphragm plates when the transmittter is operated as a reverse-acting unit.

References Cited

UNITED STATES PATENTS

| | | | |
|---|---|---|---|
| 2,804,877 | 9/1957 | Rosenberger ______ | 137—86 X |
| 2,914,077 | 11/1959 | Grogan ______________ | 137—86 |
| 3,326,228 | 6/1967 | Phillips _____________ | 137—86 |

WILLIAM F. O'DEA, *Primary Examiner.*

DAVID R. MATTHEWS, *Assistant Examiner.*